W. H. CARTER.
KNITTED FABRIC AND METHOD OF PRODUCING THE SAME.
APPLICATION FILED DEC. 30, 1916.

1,231,565.

Patented July 3, 1917.
5 SHEETS—SHEET 1.

Inventor:
William H. Carter,
by Emery, Booth, Janney and Varney
Attys.

W. H. CARTER.
KNITTED FABRIC AND METHOD OF PRODUCING THE SAME.
APPLICATION FILED DEC. 30, 1916.
1,231,565.
Patented July 3, 1917.
5 SHEETS—SHEET 2.
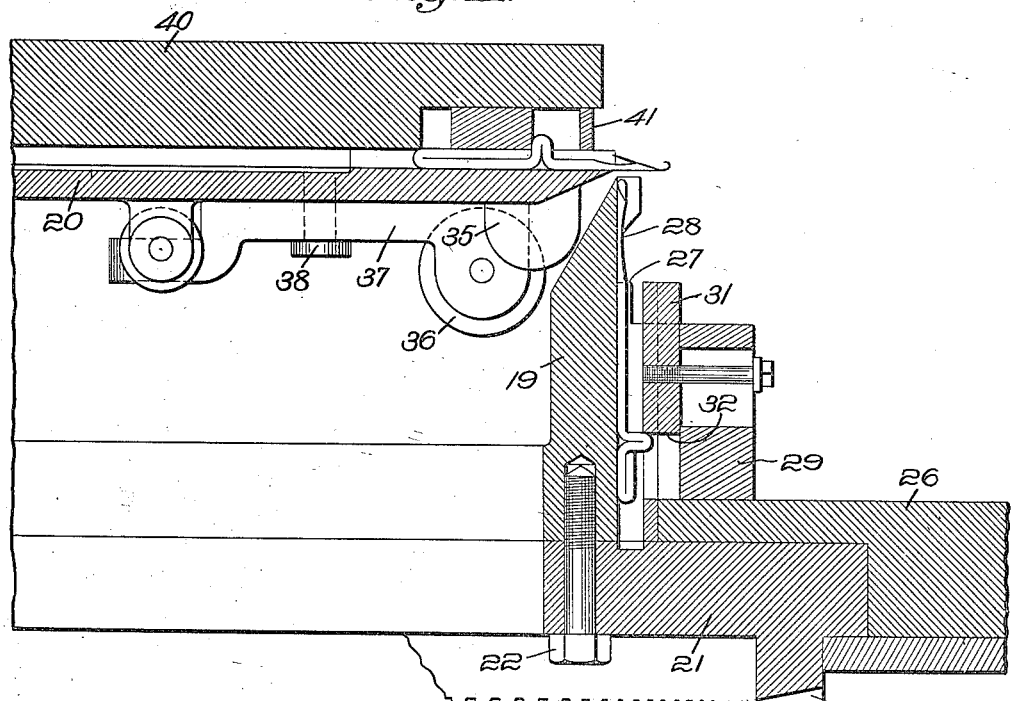
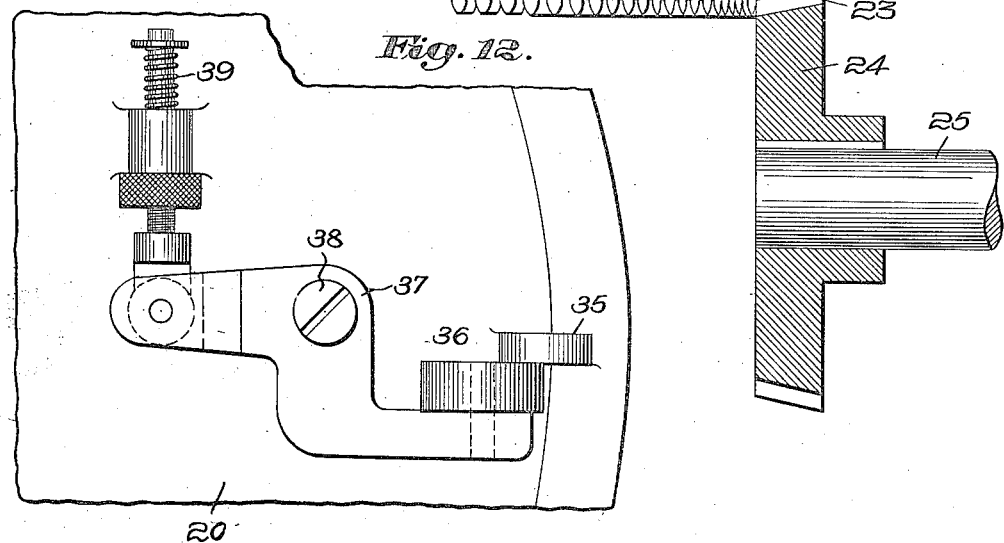
Inventor:
William H. Carter,
by Emery, Booth, Janney and Varney,
Attys.

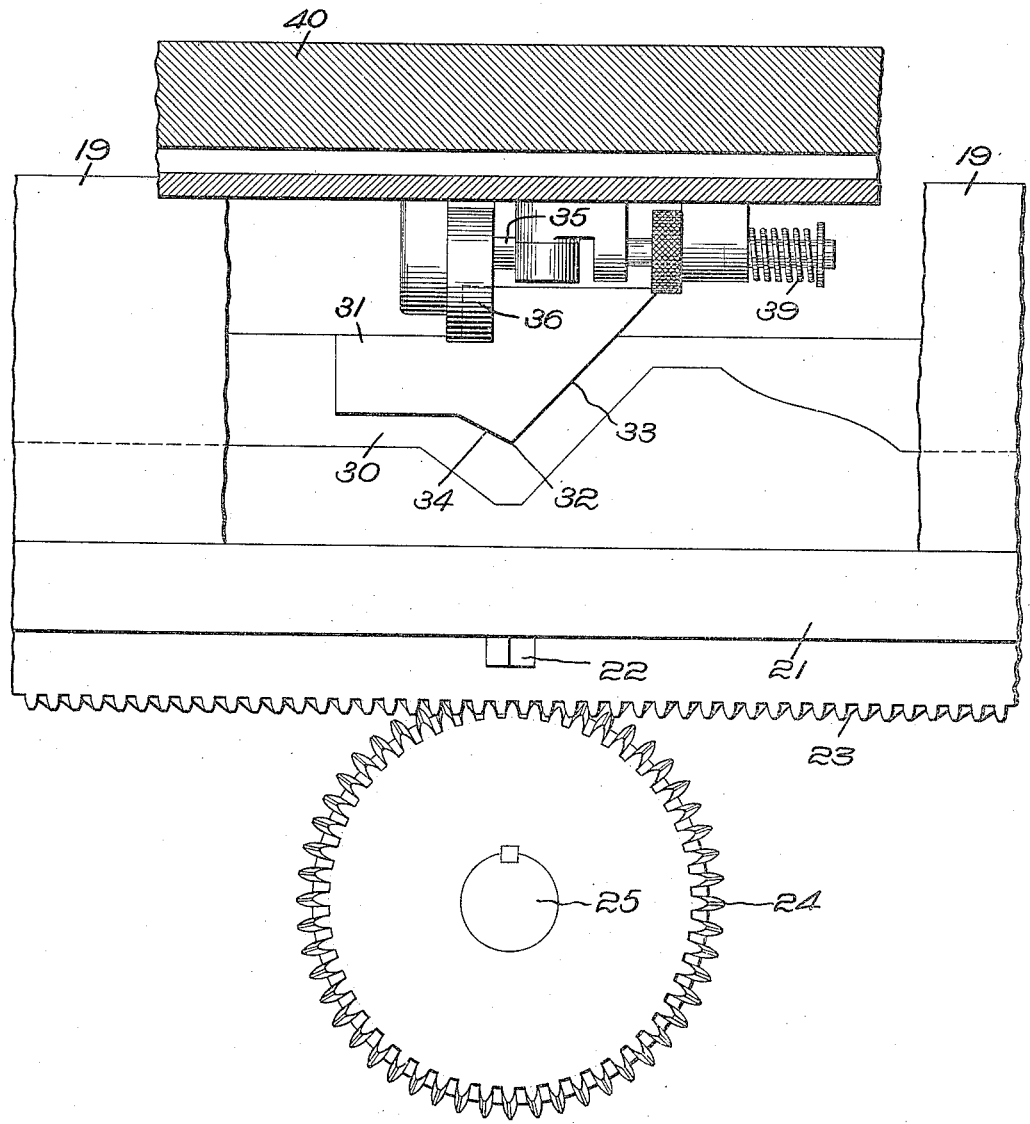

W. H. CARTER.
KNITTED FABRIC AND METHOD OF PRODUCING THE SAME.
APPLICATION FILED DEC. 30, 1916.

1,231,565.

Patented July 3, 1917.
5 SHEETS—SHEET 4.

Inventor:
William H. Carter.
By Emery, Booth, Janney and Varney
Attys.

W. H. CARTER.
KNITTED FABRIC AND METHOD OF PRODUCING THE SAME.
APPLICATION FILED DEC. 30, 1916.
1,231,565.
Patented July 3, 1917.
5 SHEETS—SHEET 5.
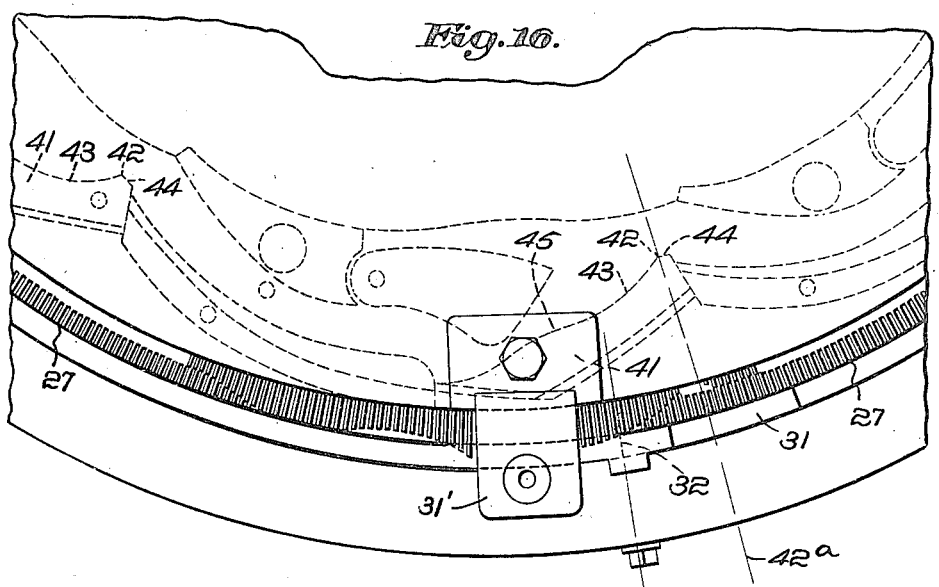
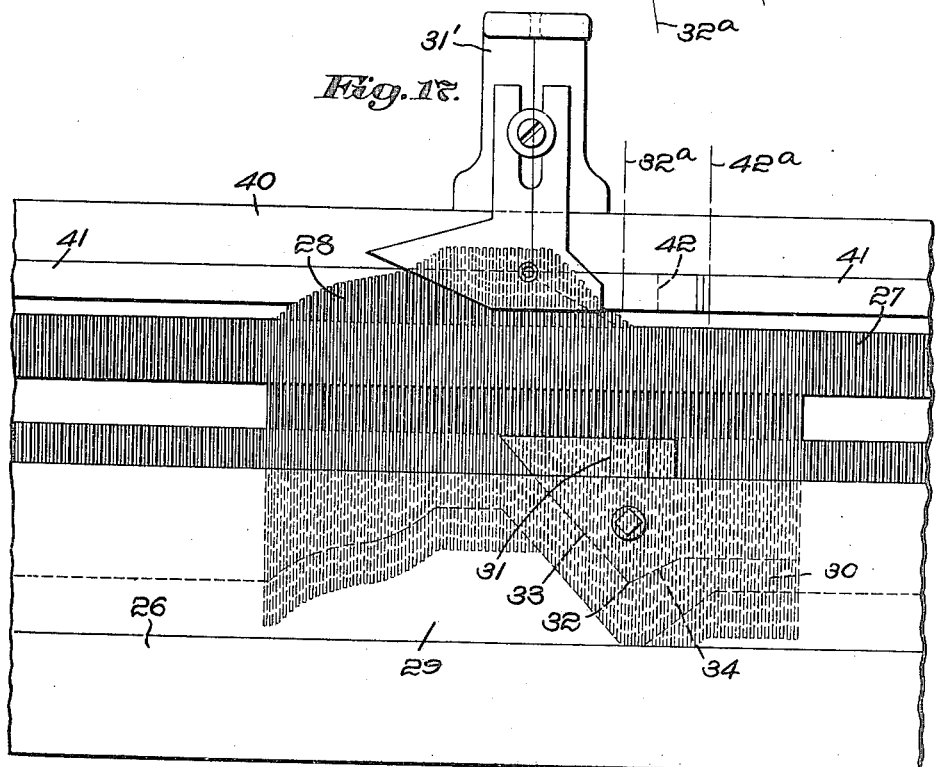
Inventor:
William H. Carter,
by Emery, Booth, Janney and Varney,
Attys.

UNITED STATES PATENT OFFICE.

WILLIAM H. CARTER, OF NEEDHAM HEIGHTS, MASSACHUSETTS, ASSIGNOR, BY MESNE ASSIGNMENTS, TO THE WILLIAM CARTER CO., OF NEEDHAM HEIGHTS, MASSACHUSETTS, A CORPORATION OF MASSACHUSETTS.

KNITTED FABRIC AND METHOD OF PRODUCING THE SAME.

1,231,565.      Specification of Letters Patent.      Patented July 3, 1917.

Continuation of application filed January 6, 1912, Serial No. 669,741. This application filed December 30, 1916. Serial No. 139,750.

*To all whom it may concern:*

Be it known that I, WILLIAM H. CARTER, a citizen of the United States, and a resident of Needham Heights, in the county of Norfolk and State of Massachusetts, have invented an Improvement in Knitted Fabric and Method of Producing the Same, of which the following description, in connection with the accompanying drawings, is a specification, like characters on the drawings representing like parts.

This invention relates to knitted fabrics and to an improved method of producing the same and is a continuation of my copending application Serial No. 669,741, filed January 6, 1912.

In order that the principle of the invention may be readily understood, I shall disclose said fabric and the best mode known to me for producing a fabric in accordance with my invention and shall disclose one form of machine by which the method of my invention may be carried out, but to which my invention is not restricted.

In the drawings:

Figure 1 is a plan view of the cylinder face of a one and one, rib knitted fabric of my invention and made by the method herein described and claimed;

Fig. 2 is a similar view of the dial face thereof;

Fig. 11 is a vertical sectional view taken through a portion of the cylinder and dial of a knitting machine that may be and preferably is employed in the practice of my invention;

Fig. 12 is a plan view of the portion of the under side of the dial of such machine showing the manner of driving the dial from the cylinder;

Fig. 13 is a side elevation partly in section representing the cylinder stitch cam and adjacent parts of such machine;

Figure 14:
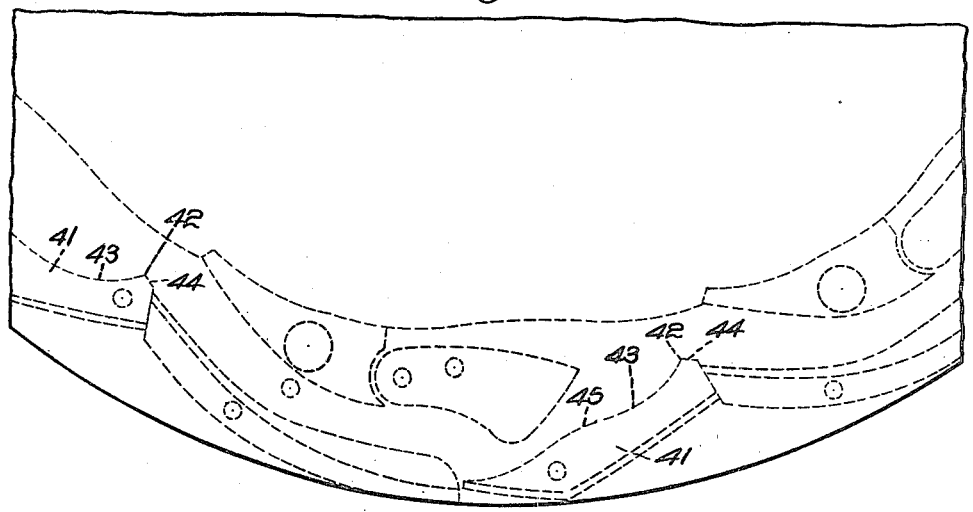
Figure 15:
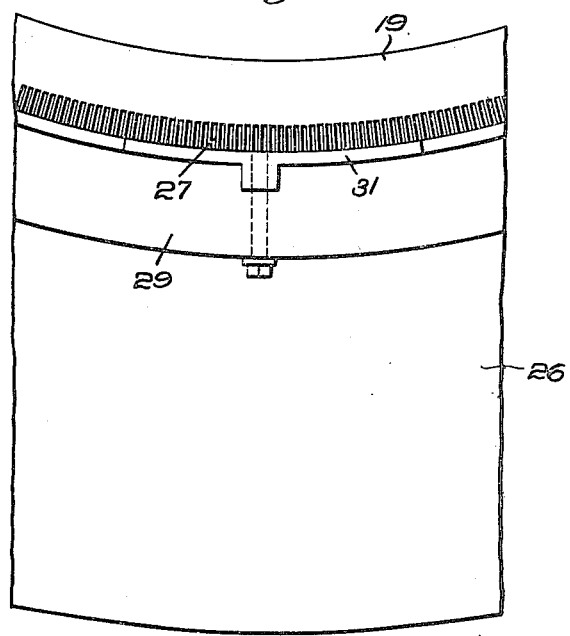

Fig. 14 is a plan view of a portion of the dial cams thereof;

Fig. 15 is a detail showing in plan the upper portion of the needle cylinder and the needle slots of such machine;

Fig. 16 is a plan view of a portion of the dial and a portion of the cylinder and one thread feed of such machine and also showing the wave of the dial needles thereof; and Fig. 17 is a front elevation of that portion of the cylinder and of that portion of the dial of such machine shown in Fig. 16.

In accordance with the preferred steps or features of my method, I form a machine-knitted, latch needle, rib fabric, and preferably by supplying yarn in succession to each member of two oppositely disposed series of loop forming instrumentalities, by drawing the yarn into loops of substantially equal and uniform size by movement thereof in an axial direction of each of said instrumentalities while maintaining the yarn of each of said loops under substantially uniform tension, and by thereafter casting off such loops upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact. The other preferred steps or features of the method of my invention will be more fully set forth hereinafter.

In order fully to disclose my invention I shall proceed to describe a fabric made in accordance therewith and the steps taken in the formation of such fabric, and also a machine by which such fabric may be produced in accordance with my method. I shall also set forth the characteristics of, and hereinafter claim, the fabric constituting a part of my invention.

The fabric made in accordance with my method is a highly elastic, machine made, rib stitch, fabric herein shown as a one and one, rib fabric, it being evident that the fabric, in accordance with certain features of my invention, may be a two and one or a three and one or other suitable fabric. The fabric herein disclosed is very highly elastic; it may readily be stretched and when released springs back almost instantly to its original size. In order to construct the said fabric, I make the loops upon both faces of the same size; I form the loops of an exceedingly small size; that is, I form as many loops as possible in a given area; the loops are laid or formed at both faces with an even strain by the needles and are preserved with the same strain as laid; adjacent wales upon both faces of the fabric physically contact when the fabric is in normal or unexpanded condition. I employ a smooth yarn, preferably silk, though I may employ wool, cotton or mercerized cotton; I so construct the fabric that the loops at both faces have open throats when said loops are contracted; I so construct the fabric that upon both faces the loops are short and round with the described open throat; I employ the largest number possible of latch needles, so that their loops are together as near as possible both laterally and longitudinally of the fabric, and the construction of the machine and needles is such that the yarn pertaining to each loop is always preserved by it, the needles of the dial and cylinder being so relatively proportioned and the machine being so constructed that the loops upon both faces are of the same size, both when initially formed and thereafter. In other words, I form the dial needles of a size different from that of the cylinder needles as regards the height of their cheeks and hooks, so when the yarn is laid I immediately secure a fabric wherein the loops upon both faces are equal in size, and I am not compelled after laying the yarn to equalize the loops. Corresponding loops on both sides of the fabric embodying my invention are substantially identically located with respect to each other and are of substantially the same size and are of substantially the smallest known size, namely, forty to the inch in each wale. In the disclosed embodiment of the invention, the said fabric has eighteen loops to the inch in each course on each face thereof while on the needles and prior to lateral contraction consequent upon casting off.

In producing this fabric, I employ dial needles of a different size from the cylinder needles as hereinafter set forth, but both of these sets of needles differ from those heretofore employed. In addition to this, I so construct the machine as regards certain features thereof that I may not only insure the fabric having the smallest possible loops as described, but also loops of equal size upon both faces and laid with the same needle strain. As I shall hereinafter more fully set forth, the cams both of the cylinder and dial are so constructed as to prevent undue stretching of the yarn or robbing of the needles, and the needle cylinder walls are so constructed as to permit the use of the described number of needles effectively, the needle verge being such as to prevent the undue drawing upon the yarn by the dial needles when the latter are retracted to form their loops.

In order that I may clearly and fully set forth my invention, I shall first describe the characteristics of rib fabric formed upon a spring beard needle machine, wherein the needles are arranged in two circles, as, for example, in the well-known Cooper type of machine, and shall also describe the characteristics of rib fabric formed upon the usual latch needle dial machine, in order that I may contrast therewith the fabric produced by the mechanism herein disclosed.

In a spring beard needle machine of the Cooper or similar type, the needles are arranged in two circles, the lower corresponding to the cylinder needles of a latch machine and being vertically positioned, and the upper circle of needles being nearly vertical but inverted and generally corresponding to the dial needles of a latch machine. In the said spring needle machine, the loops of the yarn are first laid onto the lower needles and by the sinkers, etc., are divided and laid onto the upper needles; that is to say, the yarn is first laid in its entirety upon a series of the lower needles and then from between these needles the yarn is drawn and placed upon the corresponding upper needles. Usually eight or nine of the lower needles get their loops before the corresponding upper needles receive theirs. Therefore, the yarn as laid upon the lower needles is at first slack, and when it is divided and put on the upper needles, it is thereby tightened; and the effect of this is to tighten the yarn or loops previously laid upon the lower needles. When laid on the lower needles the yarn is primarily positioned in the extreme upper end of the hooks or eyes of the needles and when the beards thereof are pressed to let off the loops previously placed on the needles and now below the beards, said beards cannot be pressed directly against the said loops inside the beards, which are too high in the eyes of the needles, and moreover, the loops in the eyes of the needles behind the beards are not yet fully tightened. In the needles of the upper circle, however, when the yarn has been put under their beards in the dividing of the loops, it is thus placed there in a condition of maximum or extreme tension, and moreover it is not in the extreme ends of the hooks or eyes of the needles, but nearer the free ends of the needle beards, so that when the beards are pressed, there is danger that the beards will cut the loops already inside the beards and directly under the points where the beards are pressed close to the needles. Therefore the upper needles of the Cooper machine are made larger than the lower needles thereof in order to avoid such cutting of the yarn and to permit the yarn to move properly under the needle beards. The outside of the fabric made by such machine is formed by the needles of the upper circle, and the wales upon the said outer face when carefully examined, as for example under a microscope, are found to be in contact when the fabric is contracted,—that is, in normal condition. On the opposite or inside face of the fabric made by the lower or cylinder needles the wales are not together. The reason for this condition is that the larger or upper needles make larger loops, and hence wider wales. and therefore these wider wales contract by the enlargement of their loops sufficiently to bring said wales into contact before the wales on the other face of the fabric are permitted to contact, the result being that the said wales upon the lower needle or cylinder side of the fabric never come together actually into contact.

The contraction of a knitted fabric which has been expanded by hand or wear is owing to the automatic enlargement of the individual loops, and the finer these loops are when made the greater their tendency to expand or enlarge. A large or loosely knitted loop has less tendency to expand than a fine tightly knitted loop. When a loop expands, it draws upon the material of the yarn lying between adjacent loops of that face in the same course. It is the automatic taking up of a portion of this straight lying yarn intervening between adjacent loops in the same course that brings the loops in adjacent wales on the same face together or closer together.

In the fabric of the ordinary latch needle dial machine the dial loops are larger than the cylinder loops, and hence the wales of the dial loops contact before those of the cylinder needles can with the result that the adjacent wales made by the cylinder needles never come into contact. Customarily the cylinder needles are larger than the dial needles; that is to say, they are provided with larger hooks, but the loops formed upon the cylinder needles are invariably smaller than those formed upon the dial needles. This is due to the manner of forming the loops upon the two sets of needles. In laying the yarn into the needles of the machine, it is laid directly into the eyes or hooks of the cylinder needles which are projected and vertical, and thus the yarn is not at such times stretched across the cheeks of the cylinder needles. In laying the yarn in the dial needles, however, the yarn is laid directly over the cheeks of the said dial needles, it passing about the cheeks of the said dial needles into the upper extremity of the hooks of the cylinder needles. The cylinder needles when projected to get their next loops let the last laid loops slip down from their cheeks, but this does not result in giving more yarn to the said former laid loops of the cylinder needles, but merely stretches the yarn. In the case of the dial needles, moreover, the preceding loops laid thereon, and which are now back of the latches, hold or wedge the latches of the dial needles up somewhat, thereby compelling more yarn to be given to the dial needles for the new loops as the yarn is laid thereon. In other words, the dial needles tend constantly to rob the cylinder needles of a portion of their yarn, so that more yarn is actually consumed in forming the loops of the dial needles than in forming the loops of the cylinder needles. The result, therefore, is that the loops of the dial needles are the larger, and it is these dial loops which come into contact in the contraction of the fabric after expansion and assist in preventing the cylinder loops from similarly contacting.

Thus in both the spring needle machine and in the dial latch machine the upper loops,—that is, the loops made by the upper circle of needles,—are the larger but for different reasons. Furthermore in the said dial latch machines the dial loops are also enlarged because as the dial loops are being cast off, the new dial loops are thereby forced along the cheeks from all of the latches toward and into the hooks so as further to stretch or enlarge the new loops. The new dial loops can and do take yarn not only from the cylinder needles, as previously stated, but also from the dial loops of the immediately preceding course just before such preceding dial loops are cast off. In the machine whereby my method may be and preferably is carried out, and by which preferably I make my fabric on the contrary, when the fabric is in its normal or non-distended condition, the adjacent wales upon the two faces of the fabric respectively are in actual physical contact. The loops of the wales made by the dial needles are so small that by the time said dial loops have expanded sufficiently to come into contact, the wales upon the other face of the fabric have also come into physical contact. The loops upon both faces of the fabric expand and take up a sufficient amount of the straight lying yarn between adjacent wales in the same course to bring the adjacent loops in the same course on the same face into contact. In other words, upon each face the loops and the length of the yarn between adjacent loops in the same course are so proportioned as to effect the bringing together of adjacent loops in the same course on each face of the fabric.

As already stated, in rib fabrics heretofore knitted upon dial machines, the adjacent wales upon the cylinder face of the fabric do not contact, when the fabric is in normal condition. This is because of the fact that in formation the cylinder loops have been pulled very tight and robbed of a part of their yarn by the dial needles, thus preventing subsequent expansion of the cylinder loops equally with the dial loops. The dial loops cannot be robbed after they are knit to equalize the loops upon the two faces, because the throats of the cylinder loops are so small that no yarn from the adjacent dial loops can enter into and enlarge the cylinder loops, so as to cause adjacent loops upon the cylinder face actually to contact.

In the fabric of my invention and produced in accordance with my method, on the contrary, upon both faces thereof the loops in adjacent wales in the same course are in physical contact in the normal condition of the fabric. This characteristic feature of the fabric of my invention and made in accordance with my method exists because the loops are of the same size upon both faces of the fabric and are laid and preserved with even strain. Such characteristic feature also denotes that the loops upon both faces expand evenly and to the same extent after the fabric has been stretched and that upon both faces of the fabric, the loops expand, after stretching of the fabric, to the same extent. Were not the loops upon the two faces of the fabric of equal size, then when the loops expand, upon release of the fabric after stretching, the loops of adjacent wales upon one face would contact before and prevent contact of the corresponding loops upon the opposite face. Furthermore, because the contact of adjacent loops upon one face prevents the contact of adjacent loops upon the opposite face, the complete contraction of the fabric into the smallest possible lateral dimension is prevented.

In order to produce a fabric in accordance with my method, I employ as many latch needles as possible both in the cylinder and in the dial, preferably employing eighteen needles to the inch in each series. Not only are the needles reduced in thickness for this purpose, but the needles employed by me have relatively finer or smaller cheeks and hooks than pertain to needles of such gage. The dial needles are so proportioned as to thickness and size of the cheeks and hooks with respect to the cylinder needles that the loops made by the dial needles are initially and always of the same size as those made by the cylinder needles. This equalization of the sizes of the dial and cylinder loops permits the contraction of the fabric after expansion until adjacent wales touch each other upon each face of the fabric. If it be attempted to employ eighteen needles to the inch in both the cylinder and in the dial, but using the ordinary type of needle merely reduced in thickness, the loops will frequently be broken when expanded or strained sufficiently to be cast off. In other words, the small loops made by said thinner needles, which are unmodified as to cheeks and hooks further than required by the reduction in thickness of the needles, are so small that said cheeks and hooks break the loops in casting them off. Moreover if the machine could be operated successfully with eighteen needles to the inch in both cylinder and dial but with unmodified cheeks and hooks, save as called for by the reduction in the thickness of the needles, the loops of the fabric would be larger than those formed by the needles employed by me.

In knitting a fabric in accordance with my method, the cylinder loops are made so tight and small that the dial needles cannot rob the cylinder needles substantially of yarn. Therefore the dial loops cannot be enlarged through robbing the cylinder needles and the cheeks and hooks of the dial needles are so relatively small that the dial loops cannot be enlarged when drawn over the needle cheeks.

I so construct the dial projecting cams that the yarn is just laid back of the pivots of the latches of the dial needles, the loops of the cylinder needles being laid in the hooks thereof as previously. The needles of both the cylinder and the dial are individually projected at the point where the yarn is taken and the old loop cast off, so that but a single needle of the dial or a single needle of the cylinder takes the yarn and casts off the loop at the same time. This avoids the stretching of the yarn or the use of a larger amount of yarn, consequent upon feeding the yarn to two or more needles of the dial or of the cylinder simultaneously. After each needle of the dial has taken the yarn and cast off the loop, the needle is gradually retracted, thus preventing the needle from jumping so as to rob adjacent dial needles.

The loops formed upon both faces of the fabric are round and short and have open throats, thus permitting the ready and equal contraction of the loops upon both faces of the fabric until the fabric has been extended to a remarkable degree. Heretofore the loops upon the cylinder side of the fabric have had closed throats; the result has been that the closed throats resist the expansion of the fabric more than do those upon the dial face. The open throat of the loops upon both faces is due in part to the tightness of the loop which, as previously stated, is a round short loop, and also in part to the springiness of the yarn.

The yarn preferably employed by me is a tram or Italian organzine silk, but if desired I may use wool, merino, cotton or mercerized cotton or lisle. The yarn preferably employed is also smooth, thus permitting the loops to slip readily upon each other. Woolen yarn is rough, but because of its great inherent elasticity, I have produced excellent results therewith, particularly when employing a very fine woolen yarn.

I am aware that it has heretofore been proposed to form a rib fabric upon a dial needle machine and after the loops have been formed upon the cylinder needles again to retract the cylinder needles by providing a supplemental cam, with the object of equalizing the tension of the loops upon the opposite faces of the fabric and to equalize the size of the loops. In such method of procedure, however, the loops of the cylinder needles are not primarily formed of the ultimate size, but are after initial formation, reduced in size. Moreover, in such method of operation, each cylinder needle, as it is drawn down the second time, tends to and does rob the adjacent cylinder needles, so that there is not regularity in the size of the loops of the dial and cylinder needles. Furthermore, it is impossible in this manner to form a fabric having very small, tight loops. In the practice of my method, and in producing my fabric, however, the needles of the cylinder and dial are so proportioned with respect to each other that the loops made by the dial needles, when initially formed, are of the same size as those of the cylinder needles. This is due not only to the proportioning of the two sets of needles with respect to each other, but to the laying of the thread upon the dial needles at substantially the point indicated, that is, just in the rear of the pivots of the latches, as well as to the manner of projecting the needles of the two sets to receive the yarn and other coöperating features more fully referred to hereinafter.

Figure 1:
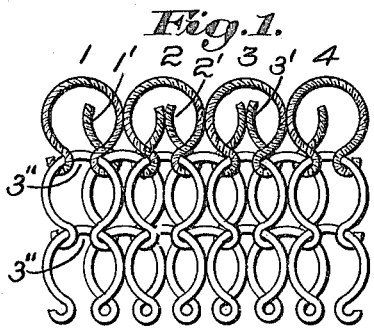
Figure 2:
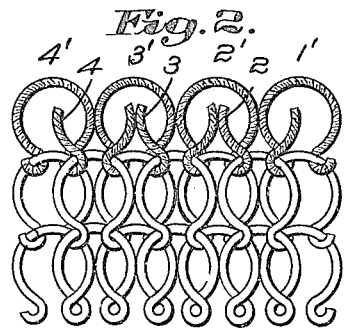

Referring more particularly to the drawings, I have in Figs. 1 and 2 indicated the front and back faces of a one and one rib fabric constructed in accordance with my method and embodying my invention. The vertical rows or loops upon the front face of the fabric are designated 1, 2, 3 and 4, etc., and those upon the back face are designated 1', 2', 3', 4', etc. The fabric is indicated in its normal unexpanded condition, and it will be noted that the loops in the vertical row 1 physically contact with those in the row 2, which latter also physically contact with the loops in the row 3, etc. In other words, throughout the fabric the loops in adjacent vertical rows are in contact upon both faces of the fabric. It will be observed that the loops upon both faces are relatively short and are substantially round and that upon both faces they have open throats 3''—3'' permitting the greater expansion of the fabric, inasmuch as the yarns of the two members of each loop do not frictionally engage each other when drawn upon in opposite directions. Owing to the small size of the needles the loops are of small size and preferably eighteen to the inch upon each face of the fabric. Moreover, the loops are tight as contrasted with a large slack loop.

Figure 9:
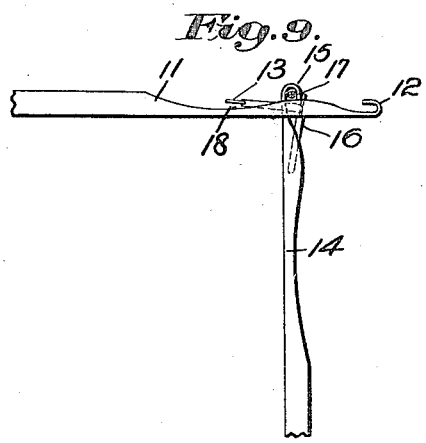
Figs. 9 and 10 are diagrammatic illustrations indicating the manner in which the yarn is laid upon the dial needles.
Figure 10:
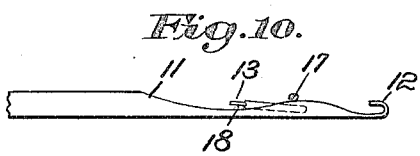

In Figs. 3 to 8, I have represented the needles preferably employed by me in the practice of my method, and in Figs. 9 and 10, I have indicated the manner in which the yarn is laid upon the needles. Preferably I make the needles so narrow that I may utilize eighteen to the inch both in the cylinder and in the dial. Instead, however, of merely proportionately reducing the size of the cheeks and hooks of the dial needles, as would be required in making needles of an eighteen inch gage, I still further reduce the size of the cheeks and hooks of the said dial needles as to height as approximately indicated in the several figures so that the yarn is not stretched when drawn over the said cheeks and hooks, and although the loops are very small and tight, they are therefore not subjected to excessive or breaking strain in casting off. I have found it unnecessary to make the described further reduction in the size of the cheeks and the hooks of the cylinder needles, as the tendency of the dial needles is to rob the cylinder needles. Such robbing does not, however, take place, because of the relative construction and proportion of parts, as herein set forth, and because of the fineness and tightness of the loops. Therefore, the loops of both sets of needles as initially formed, are the same in size and are initially formed with the same needle strain.

Figure 3:
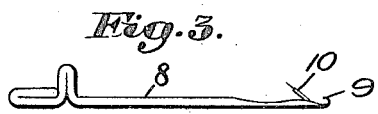
Figs. 3 and 4 are side elevations respectively (actual size) of the cylinder and dial needles preferably employed by me in producing my fabric and in carrying out my method.
Figure 4:
Figure 5:
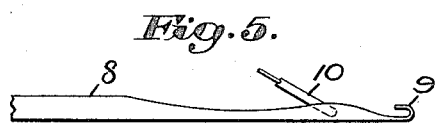
Figs. 5 and 6 are similar views representing said needles enlarged three times.
Figure 6:
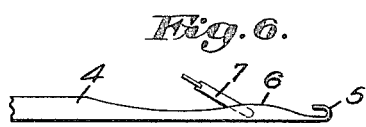
Figure 7:
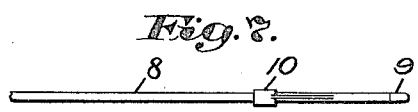
Figs. 7 and 8 are plan views of the needles shown in Figs. 3 and 4 respectively.
Figure 8:

In Fig. 4 and 6, wherein I have indicated the dial needles at 4, the hooks are indicated at 5, the cheeks at 6 and the latches at 7. While I am not to be limited to the dimensions given, I may state that the hooks of the dial needles are preferably .04 of an inch in height and the cheeks thereof are .035 of an inch in height, the hooks of the cylinder needles being .045 of an inch in height. Each of the needles is .018 of an inch in thickness or cross section. In Figs. 3 and 5, I have indicated the cylinder needle at 8 as having hooks 9 and cheeks 10 preferably of the proportions indicated. The latches of the cylinder needles are, however, shorter than would be normally provided for an eighteen inch gage needle, because if the latches be not shortened, they would be slightly later in closing and would therefore strike the adjacent dial needles because of the exceedingly narrow needle walls. In Figs. 3 and 4, I have indicated the cylinder and dial needles, and so far as possible have shown them of actual size, whereas in Figs. 5 and 6, I have indicated them as enlarged three times.

In Figs. 9 and 10, I have indicated diagrammatically the manner of supplying the yarn to the dial and cylinder needles. In Fig. 9, the dial needle is indicated at 11, its hook at 12 and its latch at 13. The adjacent cylinder needle is represented at 14, its hook at 15 and its latch at 16. It will be observed that the yarn is laid at 17 in the hook of the cylinder needle at a point very slightly in the rear of the pivot of the latch 13, the yarn of the preceding loop at 18 lying at this time under the latch 13 of the dial needle. In Fig. 10 wherefrom, for sake of clearness, the cylinder needle has been omitted, the yarn at 17 is indicated as positioned very slightly in the rear of the latch 13. Moreover the construction of the dial needles is such that the latches thereof lie substantially flat when open, substantially as indicated in Fig. 9 so as not to stretch the newly laid loops. Viewing Fig. 9 and also Figs. 11, 16 and 17, it will be evident that the loops are not simultaneously nor substantially simultaneously formed, and are not simultaneously nor substantially simultaneously cast off from the dial needle and cylinder needle. Owing in part to the very fine gage of needles employed, preferably 18 to the inch in the cylinder and 18 to the inch in the dial, I have discovered that the yarn will inevitably be broken if it be attempted to draw upon needles of the cylinder and dial simultaneously or substantially so, and that a commercially acceptable fabric cannot be formed.

In Figs. 11 to 17, I have represented the necessary parts of the mechanism for making the fabric. Referring first to Fig. 11, the needle cylinder is indicated at 19 and the dial needle plate at 20. Preferably I rotate the needle cylinder and dial needle plate and to that end secure the needle cylinder to the ring 21 by bolts 22 and provide said ring with bevel or other teeth 23, with which mesh the teeth of a bevel gear 24 upon the drive shaft 25, which is driven in any suitable manner. The ring 21 is supported by the bed plate 26 of the machine in the customary manner. The walls 27 of the needle cylinder shown also in Figs. 16 and 17 are closer together than heretofore in order to accommodate the intended number of cylinder needles 18 to the inch substantially as indicated in Fig. 15. Furthermore the said walls 27 are reduced in thickness by preferably a thirty-second of an inch, so as to permit the use of the stated number of needles to the inch, the needle walls being preferably one thirty-second of an inch in thickness.

Upon the bed plate 26 I mount the cam cylinder 29 which therefore is stationary and is adapted to project and retract the needles in the rotation of the needle cylinder. The cam cylinder 29 is provided with a cam track 30, a portion of which is shown in Figs. 13 and 17. I provide one or more stitch cams 31 corresponding in number to the yarn feeds, one of which feeds, of any suitable character, is indicated at 31' in Figs. 16 and 17, as secured to the dial, and I provide each stitch cam 31 with a sharp point 32 where the cam faces 33, 34 meet, in order that but a single needle at a time may be retracted to the extreme extent, such point of extreme retraction being, as is evident from a comparison of Figs. 11 and 13, and as clearly indicated in Figs. 16 and 17, circumferentially removed from the nearest point of extreme retraction of the dial needles to such an extent that there is no simultaneous or substantially simultaneous drawing upon the needles and casting off of the loops therefrom. The point of extreme retraction of the cylinder needles is indicated at 32, and the point of extreme retraction of the dial needles is indicated at 42; the radial line drawn from such point 32 is indicated at 32ª in Figs. 16 and 17, and the radial line drawn from such point 42 is indicated at 42ª in Figs. 16 and 17. In this manner I avoid undue straining or stretching or drawing out of the yarn which results when two or three needles are simultaneously retracted to the maximum extent. If several needles were drawn down together, the parts being otherwise proportioned and constructed as herein described, in the attempt to make small, tight loops, the yarn would be stretched to such an extent as to break.

In order to drive the dial needle plate 20, I provide the needle cylinder 19 with a suitable number of lugs 35 preferably four in number and arranged ninety degrees apart about the cylinder. These lugs contact with lugs or rollers 36 mounted upon levers 37 pivoted at 38 upon the under face of the dial and having their opposite ends spring pressed as indicated at 39, so as to hold the lugs or rollers 36 in engagement with the lugs 35, but permitting slight yielding, so as not to injure the fabric passing therebetween. For the same reason, I preferably form the lugs or rollers 36 of suitable non-metallic material, such, for example, as hard fiber, and if desired may form the lugs 35 of similar material and insert them into or otherwise secure them to the needle cylinder 19. I have found that the use of metallic driving lugs injures the fabric.

In Figs. 14 and 16 I have indicated one section of the cams of the dial cam cap 40. These cams correspond in number to the feeds 31' of the machine and to the stitch cams of the cam cylinder and may be of any suitable construction with the exception of the cast off cam 41 which, as indicated at 42, is provided with a sharp point at the meeting of the cam faces 43, 44, in order that, as set forth with respect to the stitch cam 31, only a single needle will be retracted at the same instant of time by each cast off cam, and as previously pointed out, as clearly indicated in Figs. 16 and 17, such point of extreme retraction is sufficiently circumferentially removed from the nearest point of extreme retraction of the cylinder needles, to prevent simultaneous or substantially simultaneous drawing upon a dial and cylinder needle and simultaneous or substantially simultaneous casting off of the loops therefrom. The needles travel in the direction of the arrow in Fig. 14 and after each needle has been retracted to the maximum extent at the point 42, it is gradually projected again by the face 44 of the cam which is gradually sloped as indicated in order to prevent the jump forward of the needle with the consequent drawing of an undue amount of yarn and the robbing of adjacent dial needles. Moreover each of the cast off cams 41 is provided upon its face 43 with an enlargement or swell 45, the purpose of which is so to position the dial needles that the yarn is laid just back of the pivots of the latches as previously described particularly with respect to Figs. 9 and 10.

In order to reduce the amount of yarn that is drawn by the dial needles and to insure that the loops of the dial needles are of the same size as those of the cylinder needles, I reduce the amount of the verge, substantially as indicated in Fig. 11, by about one-sixteenth of an inch, the verge being preferably one thirty-second of an inch. Furthermore by reducing the verge, I am enabled to form very tight loops without subjecting them to breaking strain in casting off.

From the foregoing description, it will be understood that the loops of both faces of the fabric as initially formed are of equal size and are small and tight, and when formed they are at all times subject to the same needle strain upon both faces of the fabric. This initial equalization of the size of the loops upon both faces and the equalization of strain of said loops is due to the coördination of the several features that I have hereinbefore set forth. That is to say, I effect the described result because the needles of the cylinder and dial are so proportioned with respect to each other that the loops made by the dial needles when initially formed are of the same size as those of the cylinder needles; because the yarn for the dial needles is laid as described with respect to the latches thereof; because each of the needles of the cylinder and dial is individually projected to take yarn; because the needle verge is such as to prevent the drawing of excessive yarn by the dial needles, and the robbing by the dial needles of the adjacent dial loops, also in part because of the employment of a smooth, fine yarn and because of other reasons fully set forth hereinbefore.

Having thus described one mode of practising my invention, I desire it to be understood that, although specific terms are employed, they are used in a generic and descriptive sense and not for purposes of limitation, the scope of the invention being set forth in the following claims:

1. A ribbed, knit fabric having the wales on each side formed of loops approximately round and having the loops of adjacent wales in the same course on each face of the fabric normally externally tangent to each other, corresponding loops on both sides of the fabric being substantially identically located with respect to each other and of substantially the same size and also of the smallest known size, namely, at least forty to the inch in each wale.

2. A ribbed, knit fabric having the wales on each side formed of loops approximately round and having the loops of adjacent wales in the same course on each face of the fabric normally externally tangent to each other, corresponding loops on both sides of the fabric being substantially identically located with respect to each other, and of substantially the same size and also of the smallest known size, namely, more than forty to the inch in each wale, and eighteen to the inch in each course on each face of the fabric while on the needles and prior to lateral contraction consequent upon casting off.

3. A latch needle, machine knitted, ribbed fabric having all the loops on one face produced by cylinder needles and all the loops on the other face produced by dial needles, said fabric having the wales on each side formed of loops approximately round and having the loops of adjacent wales in the same course on each face of the fabric normally externally tangent to each other, corresponding loops on both sides of the fabric being substantially identically located with respect to each other and of substantially the same size and also of the smallest known size, namely, at least forty to the inch in each wale.

4. A ribbed, knit fabric having the wales on each side formed of loops all of the same size and approximately round and the loops of adjacent wales in the same course on each face of the fabric being normally externally tangent to each other, corresponding loops on both faces of the fabric being substantially identically located with respect to each other and of substantially the same size and also of the smallest known size, namely, at least forty to the inch in each wale.

5. A ribbed, knit fabric having the wales on each side formed of loops approximately round and having the loops of adjacent wales in the same course on each face of the fabric normally externally tangent to each other, corresponding loops on both sides of the fabric being substantially identically located with respect to each other and of substantially the same size and also of the smallest known size, namely, at least forty to the inch in each wale and made by needles having a thickness of substantially .018 inch.

6. A ribbed, knit fabric having the wales on each side formed of loops approximately round and having the loops of adjacent wales in the same course on each face of the fabric normally externally tangent to each other, corresponding loops on both sides of the fabric being substantially identically located with respect to each other and of substantially the same size and also of the smallest known size, namely, at least forty to the inch in each wale and made by latch needles having a thickness of substantially .018 inch.

7. A one-and-one ribbed, knit fabric having the wales on each side formed of loops approximately round and having the loops of adjacent wales in the same course on each side of the fabric normally externally tangent to each other, corresponding loops on both sides of the fabric being substantially identically located with respect to each other, each loop retaining when the fabric is contracted the entire amount of yarn initially apportioned thereto, all the loops being normally under equal tension and being of substantially the same size and also of the smallest known size, viz., at least forty to the inch in each wale.

8. A latch needle, machine knitted, one-and-one ribbed fabric having the wales on each side formed of loops approximately round and having the loops of adjacent wales in the same course on each face of the fabric normally externally tangent to each other, corresponding loops on both sides of the fabric being substantially identically located with respect to each other, each loop retaining when the fabric is contracted the entire amount of yarn initially apportioned thereto, all the loops being normally under equal tension and of substantially the same size and also of the smallest known size, namely, at least forty to the inch in each wale.

9. The method herein described of forming machine knitted, latch needle, rib fabric, said method comprising the supplying of yarn in succession to each member of two oppositely disposed series of loop-forming instrumentalities, drawing the yarn into loops of substantially equal and uniform size by movement thereof, in the axial direction of each of said instrumentalities while maintaining the yarn of each of said loops under substantially uniform tension, and thereafter casting off said loops upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

10. The method herein described of forming machine knitted, latch needle, rib fabric, said method comprising the supplying of yarn in succession to each member of two oppositely disposed series of loop-forming instrumentalities, drawing the yarn into loops of substantially equal and uniform size by movement thereof in the axial direction of each of said instrumentalities while maintaining the yarn of each of said loops under substantially uniform tension, terminating the movements in an axial direction of each series of said instrumentalities non-simultaneously with the termination of the corresponding movement of the other series of instrumentalities, and thereafter casting off said loops upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

11. The method herein described of forming machine-knitted, latch needle, rib fabric, said method comprising the supplying of yarn in succession to each member of two oppositely disposed series of loop-forming instrumentalities, drawing the yarn into loops of substantially equal and uniform size by movement thereof, in the axial direction of each of said instrumentalities while maintaining the yarn of each of said loops under substantially uniform tension, and thereafter casting off said loops non-simultaneously from the said two series of instrumentalities upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

12. The method herein described of forming machine knitted, latch needle, rib fabric, said method comprising the supplying of yarn in succession to each member of two oppositely disposed series of loop-forming instrumentalities, drawing the yarn into loops of substantially equal and uniform size by movement thereof, in the axial direction of each of said instrumentalities while maintaining the yarn of each of said loops under substantially uniform tension, terminating the movements in an axial direction of each series of said instrumentalities non-simultaneously with the termination of the corresponding movement of the other series of instrumentalities, and thereafter casting off said loops non-simultaneously from the said two series of instrumentalities upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

13. The method herein described of forming machine knitted, latch needle, rib fabric, said method comprising the supplying of yarn in succession to each member of two oppositely disposed series of loop-forming instrumentalities, drawing the yarn into loops of substantially equal and uniform size by movement thereof singly to a maximum extent, in the axial direction of each of said instrumentalities while maintaining the yarn of each of said loops under substantially uniform tension, and thereafter casting off said loops upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

14. The method herein described of forming machine knitted, latch needle, rib fabric, said method comprising the supplying of yarn in succession to each member of two oppositely disposed series of loop-forming instrumentalities, drawing the yarn into loops of substantially equal and uniform size by movement singly to a maximum extent in the axial direction of each of said instrumentalities while maintaining the yarn of each of said loops under substantially uniform tension, terminating the movements in an axial direction of each series of said instrumentalities non-simultaneously with the termination of the corresponding movement of the other series of instrumentalities, and thereafter casting off said loops non-simultaneously from the said two series of instrumentalities upon the corresponding loops of the previously formed fabric, while preserving substantially unimpaired in each loop the amount of yarn initially apportioned thereto, whereby when the fabric is in normal condition the loops of adjacent wales in the same course upon each face of the fabric are in substantially physical contact.

In testimony whereof, I have signed my name to this specification.

WILLIAM H. CARTER.

Copies of this patent may be obtained for five cents each, by addressing the "Commissioner of Patents, Washington, D. C."